United States Patent [19]

Barkan et al.

[11] Patent Number: 4,838,675

[45] Date of Patent: Jun. 13, 1989

[54] METHOD FOR IMPROVING PROGRESSIVE LENS DESIGNS AND RESULTING ARTICLE

[75] Inventors: Eric F. Barkan; David H. Sklar, both of San Francisco, Calif.

[73] Assignee: Sola International Holdings, Ltd., Morphett Vale, Australia

[21] Appl. No.: 63,971

[22] Filed: Jun. 19, 1987

[51] Int. Cl.$^4$ .................................................. G02C 7/06
[52] U.S. Cl. ..................................... 351/169; 351/168
[58] Field of Search ................................ 351/169, 168

[56] References Cited

U.S. PATENT DOCUMENTS

| | | | |
|---|---|---|---|
| 4,240,719 | 12/1980 | Guilino et al. | 351/169 |
| 4,274,717 | 1/1981 | Davenport | 351/169 |
| 4,315,673 | 2/1982 | Guilino et al. | 351/169 |
| 4,362,368 | 12/1982 | van Ligten | 351/169 |
| 4,418,992 | 12/1983 | Davenport et al. | 351/169 |
| 4,426,139 | 1/1984 | van Ligten et al. | 351/169 |
| 4,514,061 | 4/1985 | Winthrop | 351/169 |
| 4,537,479 | 8/1985 | Shinohara et al. | 351/169 |
| 4,592,630 | 6/1986 | Okazaki | 351/169 |
| 4,606,622 | 8/1986 | Fueter et al. | 351/169 |
| 4,606,626 | 8/1986 | Shinohara | 351/169 |
| 4,640,593 | 2/1987 | Shinohara | 351/169 |
| 4,676,610 | 6/1987 | Barkan et al. | 351/169 |

FOREIGN PATENT DOCUMENTS

| | | |
|---|---|---|
| 1152368 | 8/1983 | Canada . |
| 0027339 | 3/1980 | European Pat. Off. . |
| 0039544 | 8/1981 | European Pat. Off. . |
| 0202559 | 12/1982 | European Pat. Off. . |
| PCT/DE85/-00278 | 6/1986 | PCT Int'l Appl. . |
| 2069714 | 2/1981 | United Kingdom . |
| 2090426 | 12/1981 | United Kingdom . |
| 2100877 | 12/1981 | United Kingdom . |
| 2130391 | 2/1983 | United Kingdom . |

OTHER PUBLICATIONS

Numerical Methods of Scientists and Engineers 2d Ed., Dover Publications, Inc., New York, 1973, Chapter 43-R. W. Hamming.

*Primary Examiner*—Bruce Y. Arnold
*Assistant Examiner*—Terry S. Callaghan
*Attorney, Agent, or Firm*—Burns, Doane, Swecker & Mathis

[57] ABSTRACT

A method for optimizing the performance of an ophthalmic progressive lens having a distance viewing zone, a near viewing zone, and an intermediate zone, and the resulting optimized lens are provided. The surface of the lens to be optimized, which has at least one quantitative performance characteristic, is represented by a mathematical base function which is combined with a selected optimization function. The optimization function includes at least one adjustable parameter and may have at least one boundary condition imposed on it along the boundary of a selected subregion of the lens surface. A quantitative merit figure of the combination of the base and optimization functions, which is related to the at least one performance characteristic by a selected merit function, is optimized through the at least one adjustable parameter of the optimization function. Through the optimization, there is obtained an improved surface function which represents the surface of the improved progressive lens. A lens surface responsive to the improved surface function is then formed.

20 Claims, 5 Drawing Sheets

METHOD FOR IMPROVING PROGRESSIVE LENS DESIGNS AND RESULTING ARTICLE

BACKGROUND OF THE INVENTION

The present invention relates to a method for improving the optical performance of an existing progressive lens or progressive lens design. The performance is expressed as a quantitative merit figure and is improved by selectively varying the shape of the lens surface to optimize the resulting lens' merit figure.

The method of the present invention may be applied to an ophthalmic progressive lens having distance, intermediate and near viewing regions. Methods of making progressive lens surfaces are described in Applicants' U.S. patent application Ser. No. 6/516,366 filed July 22, 1983 now U.S. Pat. No. 4,676,610, issued on June 30, 1987. This prior application is hereby incorporated by reference in the present application as if fully set forth. Lenses made according to methods described in application Ser. No. 6/516,366 have been used publicly and sold in the United States more than one year prior to the date of the present application.

"Improving" or "optimizing" a lens design involves some criterion of merit. Depending on the purpose intended for the lens, the merit criterion may weight various quantifiable lens characteristics more heavily than others. However, once such relative weightings have been chosen, a weighted combination of quantitative measures of lens performance can be formulated. An evaluation rule can thus be constructed that yields a single number which reflects the overall "quality" of the design according to the chosen weightings. Such a rule is often called a "merit function" and its value is often called a "merit figure". The merit function can be constructed such that either smaller or larger values of the merit figure indicate better lens performance. In this context, an "optimum" lens is one that minimizes or, if appropriate, maximizes the value of the merit function. A variety of such methods for minimizing or maximizing the values of such merit functions in general lens design are known in the prior art. The CODE V program available from Optical Research Associates, 550 North Rosemead Boulevard, Pasadena, Calif., is one such general lens design tool. The mathematics of such optimization procedures are discussed in, for example, Hamming, R. W., Numerical Methods for Scientists and Engineers, 2d ed., Dover Publications, New York 1973, Chapter 43.

Important quantitative measures of lens performance are astigmatism, orthoscopy, and mean curvature. These are optical measures which may be computed in two somewhat different ways. The first way, which may be termed surface measure, uses the properties of an optical surface unmodified by any effects of ray obliquity that may occur in actual use of the surface. It is known to compute such surface measures in the art of progressive lens design from the geometrical properties of the surface without reference to the overall physical configuration of use of the lens. The second way of computing the purely optical quantitative measures of lens performance may be called true optical measure which takes such ray obliquity effects into account. To compute true optical measures for an ophthalmic lens, the actual physical relationship of the lens to the eye in use must be simulated, so that correct ray angles are obtained. Ray tracing techniques may then be used to compute the true optical measures of performance.

In practice, a "family" of lens designs is constructed through a mathematical design model which contains a number of adjustable parameters that determine the quantitative performance measures of a particular design. Examples of such design models are given in Applicants' above referenced U.S. patent application.

OBJECTS OF THE INVENTION

In accordance with the present invention, the quality of a particular design can be evaluated by a merit function rule to determine its merit figure. Thus the merit function may be regarded as a function of the adjustable parameters of the design model. In this context "optimization" refers to any process for determining values of the adjustable parameters which extremize, i.e., maximize or minimize, the value of the merit function. An optimum design is one which is determined by such optimal values of the adjustable parameters.

It is another object of the present invention to provide an improved method of progressive lens design.

It is another object of the present invention to provide an improved progressive lens.

It is a further object of the present invention to provide an efficient and interactive design procedure for ophthalmic progressive lenses.

It is another object of the present invention to provide an optimization procedure for ophthalmic progressive lenses which is based on quantitative measures of lens performance.

It is another object of the present invention that the optimization procedure permit the introduction of the desirable features of an existing lens design into a new design developed through the procedure.

It is another object of the present invention to provide a quantitative merit function relating to optical performance characteristics of a progressive lens.

It is another object of the present invention to provide an optimization procedure for progressive lenses which provides the designer with direct control over selected performance characteristics, especially in selected regions of the lens.

These and other objects and features of the present invention will become apparent from this written description and the appended drawings.

SUMMARY OF PREFERRED EMBODIMENTS

The present invention provides a method for optimizing an ophthalmic progressive lens which has a distance viewing zone, a near viewing zone, and an intermediate zone in which a gradual change in optical power from the distance zone to the near zone occurs. The lens to be optimized, which has at least one quantitative performance characteristic, has its surface represented by a mathematical base surface function. The base surface function is combined with a selected optimization function that includes at least one adjustable parameter and that may have at least one boundary condition imposed on it along the boundary of a selected subregion of the lens surface. A merit figure of a new surface function that is the combination of the base and optimization functions, which is related to the at least one quantitative performance characteristic by a selected merit function, is optimized through the at least one adjustable parameter of the optimization function. Through this optimization, there is obtained an improved surface function which represents the surface of the improved progressive lens. A lens surface responsive to the improved surface function is then formed.

The subregion of the lens surface can be selected to lie within the intermediate zone, or to be coextensive with that zone. Also, the at least one boundary condition imposed on the optimization function along the subregion's boundary may be homogeneous and these conditions may be imposed on the optimization function and certain of its partial derivatives.

The selected merit function can be quadratic in the at least one adjustable parameter of the optimization function and can be either positive or negative definite, with the merit figure being optimized either when it is maximized or minimized. Also, the quantitative performance characteristic of the progressive lens which is related to the merit figure by the merit function can be at least one of astigmatism, orthoscopy, mean curvature and deviation from a target surface. In a preferred embodiment, the performance characteristic is either surface astigmatism or a combination of surface and oblique astigmatisms.

Further, the method of the present invention can be applied iteratively by varying the at least one adjustable parameter of the optimization function, evaluating the merit figure of the resulting new surface function that is the combination of the base and optimization functions, and repeating those steps until an optimum value of the adjustable parameter is obtained. Alternatively, the method can be applied so as to yield the optimum value directly.

The present invention also embraces a multifocal, progressive lens having a near viewing zone, a distance viewing zone and an intermediate zone in which there is a gradual change in optical power along an eye path from the distance zone to the near zone. The progressive lens has the surface of its intermediate zone defined by a final surface function which is a sum of an optimization function and a base surface function. The optimization function takes on non-zero values in the intermediate zone which correspond to deviations in the height of a lens surface from the height of the base surface function, and includes at least one adjustable parameter which has its value derived by extremizing a merit figure. The merit figure is related to surface astigmatism by a merit function and the optimization function changes the surface astigmatism of the final surface function by at least 0.1 reciprocal meters as compared with the base surface function and as measured at least one point in the intermediate zone. In another embodiment, the merit function is related to mean curvature by a merit function and the optimization function changes the mean curvature of the final surface function by at least 0.1 reciprocal meters as compared with the base surface function and as measured at least one point in the intermediate zone.

The present invention further embraces a method for optimizing a lens in which a base surface function is selected for a surface of a progressive lens having distance, near and intermediate zones. A gradual change in optical power from the distance zone to the near zone occurs in the intermediate zone. A merit function, which relates a weighted sum of squares of surface astigmatism at a plurality of preselected points to a merit figure of the lens, is constructed and an optimization function, which has at least one adjustable parameter, is chosen. The base surface function is combined with the optimization function to form a new surface function having the at least one adjustable parameter. The merit function of the new surface function is extremized to obtain an improved surface function that represents an improved surface of the progressive lens, and a lens surface responsive to the improved surface function is then formed.

In a further embodiment, a bounded subregion of the lens surface is defined and on the boundary zero is imposed on the optimization function and its first three partial derivatives across the boundary. The subregion can lie in the intermediate zone or can be coextensive with the intermediate zone. The optimization function can have the form of a polynomial in a curvilinear coordinate system with the coefficients of the polynomial including the at least one adjustable parameter.

BRIEF DESCRIPTION OF THE DRAWINGS

The present invention will be understood from a reading of the following detailed description in conjunction with the drawings in which.

DETAILED DESCRIPTION

General Framework

Figure 1:
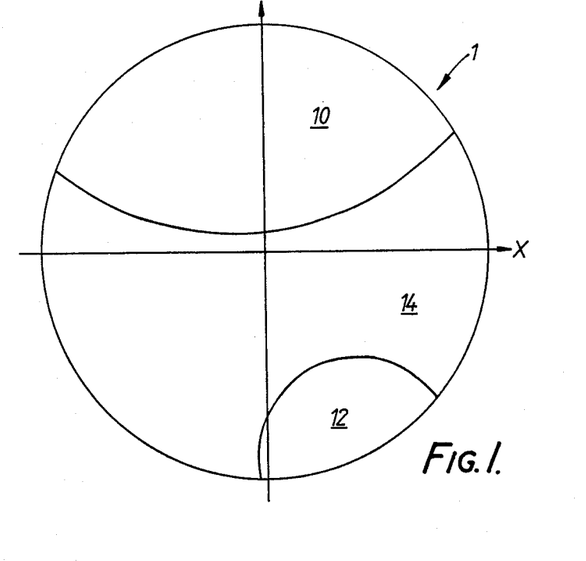
FIG. 1 is a view of a progressive lens surface having multiple regions and showing a Cartesian coordinate system used to define the lens surface.

Referring to FIG. 1, a progressive lens surface 1 may be considered as divided into three zones: a distance zone 10, a near zone 12, and an intermediate zone 14. The lens surface 1 can be described mathematically by giving its height above a reference plane. If points in the reference plane are labelled according to a Cartesian coordinate system having axes X and Y as indicated by the arrows shown, the height of the lens surface can be written as a mathematical function of points (x,y) in the reference plane.

In proceeding to develop the optimization method of the present invention, it can be observed that a lens surface height function can also be expressed as a combination of two functions, thus:

$$Z_f(x,y) = Z_b(x,y) + Z_h(x,y) \quad (1)$$

where $Z_b(x,y)$ is a base surface function, $Z_h(x,y)$ is an optimization function and $Z_f(x,y)$ is an improved surface function. $Z_b(x,y)$ represents a starting lens surface which is to be improved by the method of the present invention. In a preferred embodiment the starting lens surface may be one obtained by employing the methods set forth in Applicants' above-referenced U.S. patent application. The optimization function $Z_h(x,y)$ is created by the present method so that a new lens surface represented by the combination of the base surface function and the optimization function provides a lens having quantitative measures of optical performance which are "improved" over those of the lens represented by $Z_b(x,y)$. The new lens surface having the optimal performance is represented by the improved, or final, surface function $Z_f(x,y)$.

The base surface function may be continuous and its first several partial derivatives may be continuous as well. Similarly, the optimized lens represented by the improved surface function $Z_f(x,y)$ may also satisfy continuity conditions. As a result, the optimization function $Z_h(x,y)$ also satisfies similar conditions.

Figure 2:
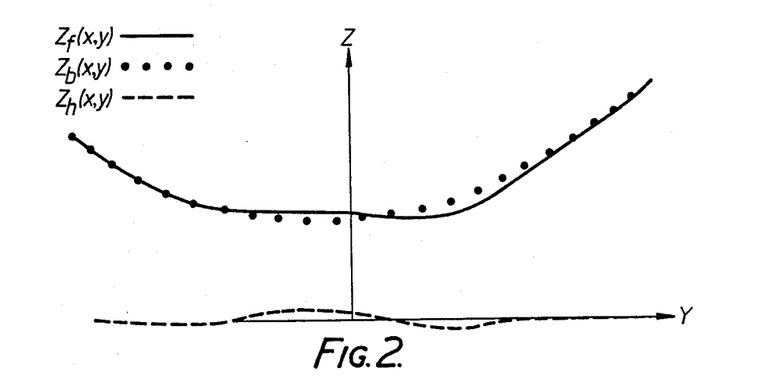
FIG. 2 is a graph of the surface height of a base surface function of a starting lens and of the surface height function of an improved lens provided by the method of the present invention.

An illustration of the effect of the optimization function $Z_h(x,y)$ on the height of the lens surface represented by the base function $Z_b(x,y)$ is shown in FIG. 2. For clarity, the values of the two surface functions are illustrated for the Y coordinate only, i.e. for a constant X coordinate. The improved surface function $Z_f(x,y)$ is shown by the solid line, the base function $Z_b(x,y)$ is shown by the dotted line and the optimization function $Z_h(x,y)$ is shown by the dashed line. It can be noted that the optimization function can take on both positive and negative values.

Figure 3A:
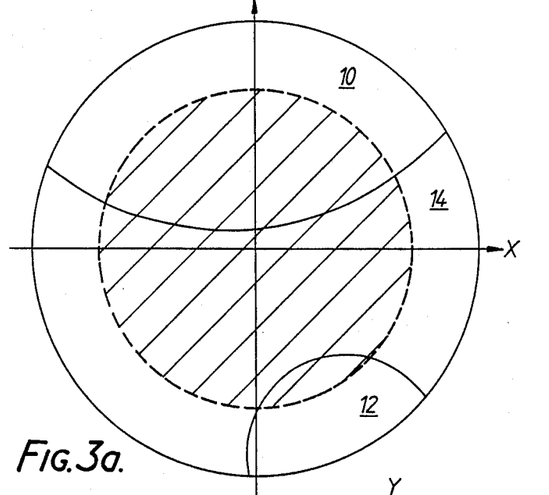
FIG. 3a is a view of a lens surface showing one location of a subregion.

In practice it may be convenient to define $Z_h(x,y)$ such that the function takes on non-zero values only within a predetermined subregion of the lens surface and is zero everywhere outside the subregion. The location and shape of the subregion can be determined arbitrarily, such as the crosshatched region shown in FIG. 3a. In a preferred embodiment the subregion corresponds generally with the intermediate zone of a progressive lens, as shown by the subregion R in FIG. 3b.

Alternatively, the optimization function may take on non-zero values in a subregion which encompasses areas both within and outside the lens.

However, when the subregion is restricted to only a portion of the lens surface, the continuity conditions introduced above require that the optimization function $Z_h(x,y)$ satisfy homogeneous boundary conditions; $Z_h(x,y)$ and some of its derivatives must be identically zero along the boundary of the subregion. Such boundary conditions cause $Z_h(x,y)$ to smoothly approach the zero value that it was defined to have outside the subregion. At least the optimization function and its first partial derivative must be zero along the boundary so that there are no sharp edges in the surface of the lens. In an embodiment described in more detail below, the optimization function and its first three partial derivatives are set to zero on the boundary.

In accordance with the present invention, for any particular form of the optimization function selected at least one adjustable parameter will be provided. In general, the optimization function can be any function of the coordinates which is determined by one or more constant coefficients; such forms include polynomials as well as Fourier series. Each form of the optimization function corresponds to a "family" of lenses as described above. The adjustable parameters, which are the scalar coefficients of the optimization function, also affect the improved surface function $Z_f(x,y)$. In the description below, the adjustable parameters are defined as the elements of an array $A_h$. Accordingly, for this description, a more explicit functional notation is adopted for Equation 1:

$$Z_f(x,y; A_h) = Z_b(x,y) + Z_h(x,y; A_h) \tag{2}$$

It will be understood that the new surface function formed by the linear combination of $Z_b(x,y)$ and $Z_h(x,y)$ shown in Equation 2 can also be formed by other, e.g. multiplicative, combinations of $Z_b$ and $Z_h$.

One way of representing the optimization function is by an expansion in terms of a system of functions of the form $P_{ij}(x,y)$, or more generally, $P_{ij}(u,v)$ where u and v are curvilinear coordinates. In a preferred embodiment the coordinates (u,v) may correspond to those coordinates (u,v) defined in Applicants' above-referenced U.S. patent application. A point (u,v) in the curvilinear system can be expressed as a point (x,y) in the Cartesian system through a transformation:

$$u = F(x,y) \tag{3a}$$

$$v = G(x,y) \tag{3b}$$

Figure 4:
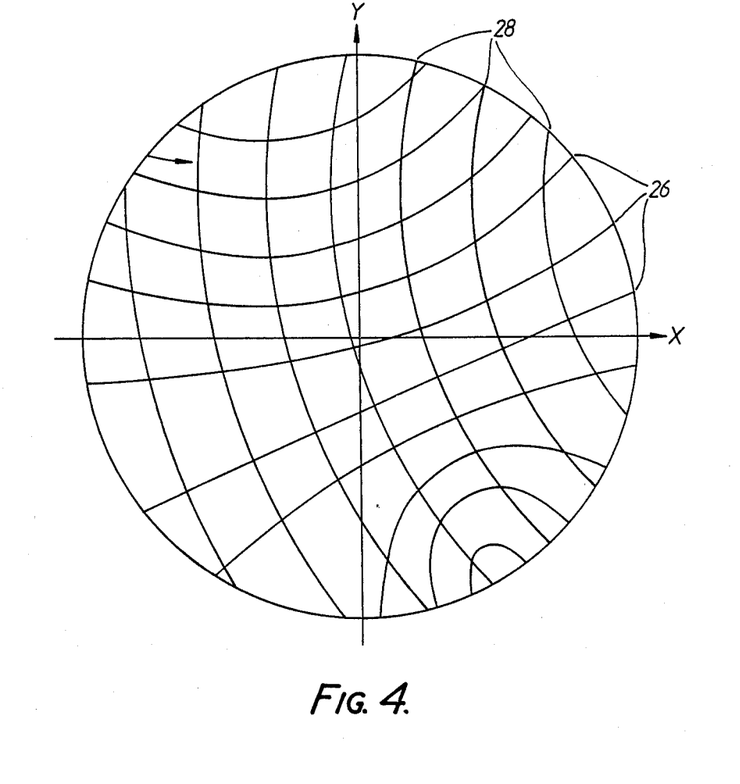
FIG. 4 is a view of a lens surface showing curvilinear coordinate curves used to define the lens surface.

It will be understood that by using the coordinate transformation of Equations 3a and 3b, functional expressions in the Cartesian system are expressible in a different, and often more convenient form, in the curvilinear system. FIG. 4 shows a view of a surface with Cartesian coordinate axes X and Y indicated by the arrows shown and an example of curvilinear coordinate curves 26 for constant v and coordinate curves 28 for constant u.

In terms of curvilinear coordinates the optimization function may be written as an expansion in terms f a system of functions $P_{ij}(u,v)$, thus:

$$Z_h(u,v;A_h) = \sum_{ij} A_{hij} P_{ij}(u,v) \tag{4}$$

where the several $A_{hij}$ are expansion coefficients, some of which can be zero. If the system of functions $P_{ij}(u,v)$ is a system of power functions of u and v, then $Z_h(u,v;A_h)$ is just a polynomial in u and v. The several $A_{hij}$ comprise the elements of the array $A_h$ of potentially adjustable parameters referred to in Equation (2). For the optimization function $Z_h(x,y; A_h)$ or its transformation $Z_h(u,v; A_h)$ to satisfy the special homogeneous boundary conditions, it is sufficient that each member of the system of functions $P_{ij}(x,y)$ or $P_{ij}(u,v)$ satisfy those conditions.

Considering Equations 2 and 4, it can be observed that the improved lens represented by the improved surface function $Z_f(x,y; A_h)$, and therefore the quantitative performance measures of the improved lens, are effectively determined by the array of adjustable parameters $A_h$. In accordance with the present invention, the adjustable parameters are varied so as to extremize a merit figure produced by a selected merit function.

Figure 3B:
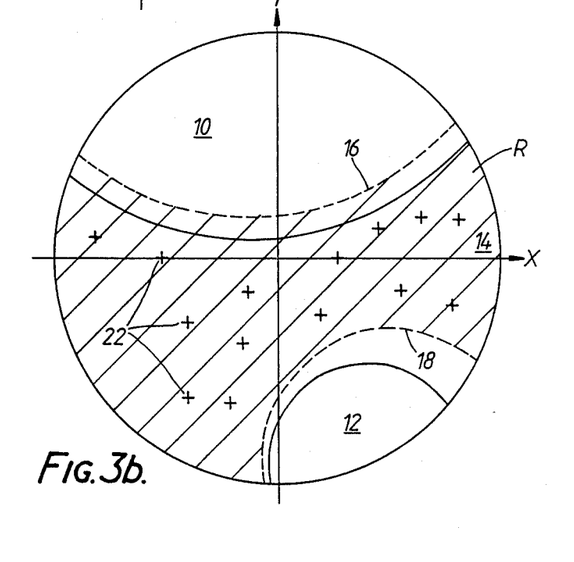
FIG. 3b is a view of a lens surface showing another location of a subregion having computation points shown within it.

A merit function $M(A_h)$ for a progressive lens may be generally defined as follows:

$$M(A_h) = \int_R m(x,y,\alpha,\beta,\ldots;A_h)dR \tag{5}$$

where $M(A_h)$ provides a global measure of lens performance in a surface region R of the lens surface based on one or more quantitative performance measures $\alpha,\beta,\ldots$ evaluated at points (x,y) in the region R. Evaluation of the merit function $M(A_h)$ for particular values of the array of adjustable parameters $A_h$ yields the merit figure for the lens defined by those parameters. The point merit function $m(x,y,\alpha,\beta,\ldots;A_h)$ can be thought of as a local measure of lens performance at a point $(x,y)$ on the lens surface. The point merit function $m(x,y,\ldots;A_h)$ is the combination of quantitative measures of lens performance referred to above. Alternatively, the global merit function may be defined as a summation over a finite set of points in the region R (e.g. the small crosses in FIG. 3b), thus:

$$M(A_h) = \sum_k m(x_k, y_k, \alpha, \beta, \ldots; A_h) \quad (6)$$

Equation 6 is more amenable to numerical computation by computer.

In terms of merit functions such as those given in equations (5) and (6), "optimization" refers to any process for finding those values of the array $A_h$ of adjustable parameters which extremize the value of the merit function. Depending on the form of the merit function selected, optimization can involve either minimizing or maximizing the value of the merit function. As mentioned above, a variety of such methods are known to those skilled in the art.

In accordance with one embodiment of the present invention, the values of the quantitative optical performance measures of astigmatism, mean curvature and orthoscopy at any given point are computed by surface measure, i.e., from the local properties of the lens surface as defined by the adjustable parameters, for use in the merit function. The relevant local properties of the lens surface are second derivatives of the surface function computed relative to a plane tangent to the surface at the point. These tangential partial derivatives can be denoted as $Z_{xx}$, $Z_{yy}$, and $Z_{xy}$ where $Z_{xx}$ is the second tangential partial derivative with respect to x of a surface function $Z(x,y)$, etc. Using this notation, the quantitative optical performance measures may be computed as follows:

Astigmatism:
$$\alpha = [(Z_{yy}-Z_{xx})^2 + 4Z_{xy}^2]^{\frac{1}{2}} \quad (7a)$$

Mean Curvature:
$$\beta = (Z_{xx}+Z_{yy})/2 \quad (7b)$$

Orthoscopy:
$$\gamma = Z_{xy} \quad (7c)$$

It will be understood that by astigmatism is meant surface astigmatism which is the difference in the principal curvatures of the surface at the point of interest. Surface astigmatism as defined by Equation 7a can have units of reciprocal meters which can be related to the common ophthalmic units of diopters by a multiplicative factor of the index of refraction reduced by unity. Similarly, the mean curvature given by Equation 7b can also have units of reciprocal meters which are convertible to diopters of spherical equivalent power by the same multiplicative factor. Also, orthoscopy relates to the rectangularity of images which are observed through the lens.

In one embodiment, the quantitative measures of lens performance are surface measures, described by Equations 7, which depend only on the geometrical properties of the lens surface. In another embodiment, the present method can employ true measures which are somewhat more difficult to compute. As discussed above, true optical measures such as oblique astigmatism, which arises when light rays encounter a refracting surface at angles off the normal to the surface, can be computed for the points in the optimization subregion by well-known ray tracing techniques. Normally, oblique astigmatism within the central thirty to forty millimeters of an ophthalmic lens is negligible, allowing the surface astigmatism alone to be used as a quantitative measure of lens performance. However, for points farther from the center of the lens, oblique astigmatism becomes more significant and so a net astigmatism, i.e. a combination of surface and oblique astigmatisms, can be used as a quantitative measure of lens performance in the present method. Of course it will be understood that net astigmatism can be used for all points in the optimization subregion, not merely for points away from the lens center.

In accordance with the present invention, a class of measures called deviation-of-performance measures permit the introduction of the desirable features of a known or target lens design into a new design. Differences between the surface measures (e.g.,$\alpha,\beta,\gamma$) of a lens design and corresponding surface measures of a target design are incorporated into the merit function in such a way that the value of the merit function, i.e. the merit figure of the improved design, decreases as the differences between the measured performances of the two designs decrease. In this way, for a merit function which is optimized by minimizing its value, the method of the present invention produces an improved lens design which approaches the optical performance of the target design.

In accordance with the present invention, each of the quantitative deviation-of-performance measures is related to but not restricted to one of the optical measures of astigmatism, mean curvature and orthoscopy and the surface height of the lens. These relationships may be given by:

$$\delta = \alpha - \alpha_t \quad (8a)$$

$$\epsilon = \beta - \beta_t \quad (8b)$$

$$\zeta = \gamma - \gamma_t \quad (8c)$$

$$\eta = Z_f - Z_t \quad (8d)$$

where $\delta$ is the deviation-of-performance measure for astigmatism, $\alpha$ is the surface measure of astigmatism for the lens being optimized, and $\alpha_t$ is the surface measure of astigmatism of the target design. The deviation-of-performance measures $\epsilon$ for mean curvature, $\zeta$ for orthoscopy and $\eta$ for surface height are similarly defined.

To emphasize that the quantitative performance measures depend on the particular design being considered (as specified by the array $A_h$) and on the particular point at which they are evaluated (as specified by its coordinates), the following functional expressions may be written:

$$\alpha = \alpha(x,y; A_h) \quad (9a)$$

$$\beta = \beta(x,y; A_h) \quad (9b)$$

$$\gamma = \gamma(x,y; A_h) \quad (9c)$$

$$\delta = \delta(x,y; A_h) \quad (9d)$$

$$\epsilon = \epsilon(x,y; A_h) \quad (9e)$$

$$\zeta = \zeta(x,y; A_h) \quad (9f)$$

$$\eta = \eta(x, y; A_h) \quad (9g)$$

The merit function $M(A_h)$ given by Equation 6 is a function of the quantitative performance measures given by Equations 9a–9g; thus combining these equations gives:

$$M(A_h) = \sum_k m(x_k, y_k, \alpha, \beta, \gamma, \delta, \epsilon, \zeta, \eta; A_h) \quad (10)$$

which, as in Equation 5, could be written as an integral over the region R.

Figure 5:
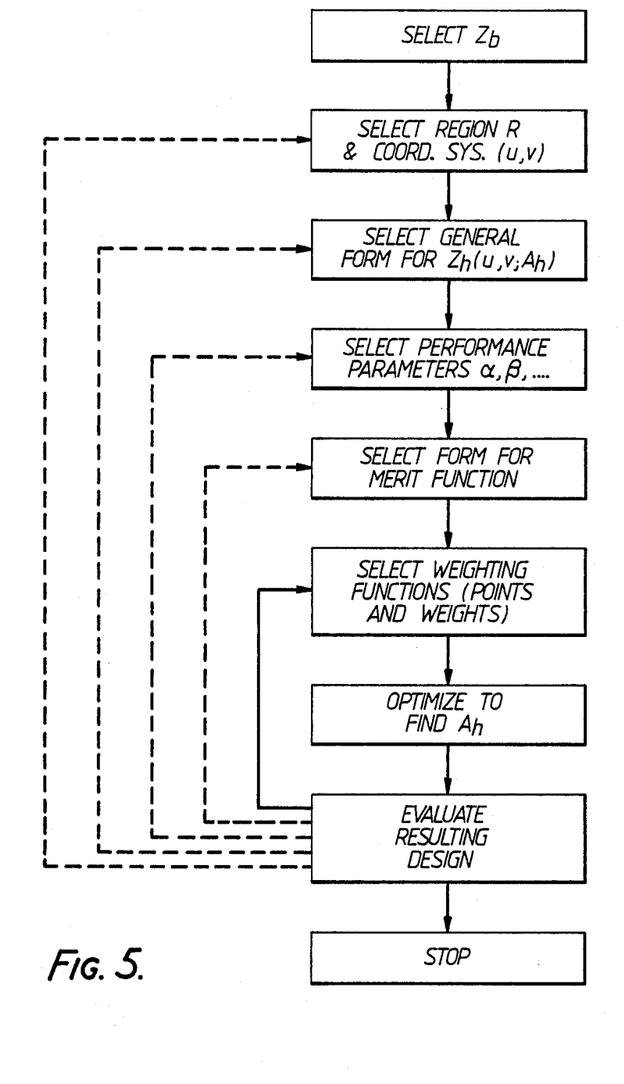
FIG. 5 is a conceptual flow chart of a design procedure in accordance with the present invention.

A conceptual flowchart of the method of the present invention is illustrated in FIG. 5. It can be noted that the particular sequence of the steps shown in the figure is substantially arbitrary and should not be considered the only acceptable sequence. A base surface function is selected which represents the surface of a progressive lens, the performance of which is to be optimized. It will be understood that the base surface function can represent a lens in accordance with the Applicants' above-cited U.S. patent application, or even a lens previously optimized by the present method. A subregion of the surface is selected for optimization and a convenient coordinate system is chosen. Typically, a generalized curvilinear coordinate system is chosen so that one or the other of the coordinates will be constant curves important in the optimization method, such as a curve defining the boundary of the optimization subregion or a curve defining an eye path from the distance zone to the near zone. The functional form of the optimization function is then selected; the form can be any two-coordinate function which is determined by one or more scalar coefficients. Useful forms of the optimization function are polynomials, which are linear combinations of power functions of the coordinates, as well as Fourier and other types of series. Since the final surface of the optimized lens will be represented by a combination of the base surface function and the optimization function, the final surface is related to the coefficients of the optimization function selected. The coefficients are treated as adjustable parameters in the optimization method and their values are selected to optimize the performance of the lens having a surface represented by the combination of the base and optimization functions.

The present method optimizes lens performance which is expressed in quantifiable performance characteristics, such as astigmatism, mean curvature, orthoscopy and deviation from a target surface. One or more of these performance characteristics, which generally have different values at each point on the lens surface, is selected and related by a merit function to a global merit figure for the lens. The particular form of the merit function is usually selected to be positive or negative definite to assure the existence of an extremum. Nevertheless, it is possible that indefinite merit functions can be used successfully by a skillful designer.

After the form of the merit function is selected, the points in the optimization region where the performance of the lens is to be evaluated are chosen. The number and locations of these points are influenced by the computation time permitted and by the skill of the designer. Besides the number and location of points, weighting factors which control the importance of each of the performance characteristics are selected for each point. In this way the designer has direct control over the performance of the lens and can preserve in selected areas the performance of the starting lens if so desired.

Depending on the form of the merit function selected, the values of the scalar coefficients of the optimization function which extremize the merit figure of the lens can then be determined either directly or iteratively. If the merit function has a form which has an extremum that is readily calculable from its coefficients, the optimization can proceed directly; an example of such a merit function is a quadratic form in the adjustable parameters. On the other hand, more complicated forms of merit functions can be used by applying the optimization iteratively, i.e. by selecting starting values of the adjustable parameters, calculating the merit figure, varying the adjustable parameters, recalculating the merit figure, etc. until an extreme value (and the corresponding optimal values of the adjustable parameters) are obtained.

Once optimal values of the adjustable parameters have been obtained for a given selection of optimization region, performance characteristics, points, weights, and merit function, the designer evaluates the resulting design and is free to vary these selections as indicated by the return arrows in FIG. 5. Typically, the designer will more often vary the selection of points and weights, as indicated by the solid-line return arrow, than the other selections, as indicated by the dashed-line return arrows. The design process illustrated by the figure can continue until the designer obtains a satisfactory lens design.

To illustrate how an optimization can proceed directly, consider a scalar quadratic function MF of a vector variable A:

$$MF(A) = A^T M A + B^T A + C \quad (I)$$

where M is a given non-singular square matrix, B is a given vector and C is a given scalar. Without loss of generality, M may be taken as symmetric, but the matrix M must be definite, i.e. the term $A^T M A$ must be either non-negative for all values of A (positive definite), or non-positive for all values of A (negative definite). This requirement assures the existence of an extremum.

The value of A which extremizes the function MF is to be determined. For now, it will be assumed that M, B and C are known. In order to find an extremum of MF, its gradient with respect to the independent variable vector A is taken:

$$GRAD\ MF = 2MA + B \quad (II)$$

Setting the gradient equal to zero and solving for the extremizing value of A gives:

$$A_{min} = -(\tfrac{1}{2}) M^{-} B \quad (III)$$

In practice, the values of M, B and C are unknown, but how to compute MF(A) for any value of A is known. M, B and C will be determined by evaluating MF on a suitably selected set of vectors H. Once M, B, and C have been found, equation (III) may be used to find the extremum of MF.

A set of vectors H where $H_i$ is the vector with exactly one non-zero component in the i'th position can be defined by:

$$H_i = (0, 0, \ldots, h_i, 0, \ldots, 0),\ i = 1 \ldots n \quad (IV)$$

where $h_i$ is the value of the non-zero component and n is the number of components of A.

To compute M, B and C, it is sufficient to compute their components. First, evaluate MF on the zero vector; this gives the value of C:

$$MF(O) = O^T MO = B^T O + C = C \quad (V)$$

Next, evaluate MF on $H_i$:
$$MF(H_i) = H^T MH_i + B^T H_i + C = h_i^2 M_{ii} + h_i B_i + C \quad (VI)$$

and then on $(H_i + H_j)$:

$$MF(H_i + H_j) = (H_i + H_j)^T M(H_i + H_j) + B^T(H_i + H_j) + C = h_i^2 M_{ii} + 2h_i h_j M_{ij} + h_j^2 M_{jj} + h_i B_i + h_j B_j + C \quad (VII)$$

Using Equations (V) and (VI), this can be written:
$$MF(H_i + H_j) = MF(H_i) + MF(H_j) - MF(O) + 2h_i h_j M_{ij} \quad (VIII)$$

Solving Equation (VIII) for $M_{ij}$ gives:
$$M_{ij} = [MF(H_i + H_j) - MF(H_i) - MF(H_j) + MF(O)] / 2h_i h_j \quad (IX)$$

This expression also gives $M_{ii}$. Thus, solving Equation (VI) for $B_i$:
$$B_i = [MF(H_i) - MF(O) - h_i^2 M_{ii}]/h_i \quad (X)$$

This completes the computation of the components of M, B and C from evaluations of MF on 0 and the set H. Equation (III) may now be used to compute the extremizing value of A.

SPECIFIC EMBODIMENTS

Having set out the general framework of the optimization method of the present invention, specific examples of a particular lens will be described. Ophthalmic progressive lenses have distance, intermediate and near viewing zones. In this example, the optimization method will be applied to optimize the performance of a progressive lens in the intermediate zone substantially as shown in FIG. 3b.

If the optimization subregion R is limited to less than all the lens surface, it has already been disclosed that the optimization function $Z_h(x,y)$ must satisfy the homogeneous boundary conditions. In carrying out the calculations of the present method, it may be convenient to employ a coordinate transformation from Cartesian coordinates to curvilinear coordinates given by:
$$u = F(x,y) = x \quad (11a)$$

$$v = G(x,y) = [f_d(x) - y]/[f_d(x) - f_n(x)] \quad (11b)$$

where $f_d(x)$ is a function, the projection of which onto the lens surface defines the top boundary 16 of the optimization subregion R, and $f_n(x)$ is also a function, the projection of which defines the bottom boundary 18 of the subregion R. The functions $f_d(x)$ and $f_n(x)$ are arbitrary, but can be low-degree polynomials. In a numerical example described in more detail below, second-degree polynomials are used. With the coordinate transformation of Equations 11a and 11b, the optimization subregion R conveniently comprises those points (u,v) on the lens surface having a v-coordinate between zero and unity.

As already noted in regard to Equation 4, in a curvilinear coordinate system the optimization function can be expressed as an expansion in a system of functions $P_{ij}(u,v)$ provided the members of the system satisfy the homogeneous boundary conditions. The members of a system of functions which meet those conditions are given by:

$$P_{ij}(u,v) = S(u,v) v^{l_d} (1-v)^{l_n} u^i (0.5-v)^j \quad (12)$$

where $S(u,v)$ is a multiplicative auxiliary function such as that disclosed in Applicants' above-cited U.S. patent application, the disclosure of which has been incorporated by reference. Also, $l_d$ and $l_n$ are fixed exponents which provide that the system of functions $P_{ij}(u,v)$ satisfies the homogeneous boundary conditions, and i and j are integers. Using the system of functions having members defined by Equation 12, the optimization function $Z_h(u,v;A_h)$ given by Equation 4 can be written as:

$$Z_h(u,v;A_h) = S(u,v) v^{l_d} (1-v)^{l_n} \sum_{ij} A_{hij} u^i (0.5-v)^j \quad (13)$$

The multiplicative auxiliary function $S(u,v)$ can take any form so long as the members of the system of functions $P_{ij}(u,v)$ satisfy the homogeneous boundary conditions. Recalling that the coordinate transformation of Equations 11a and 11b produces an optimization subregion having boundaries of v=0 and v=1, the members of the system of functions $P_{ij}(u,v)$ will satisfy the homogeneous boundary conditions so long as $S(u,v)$ does not include factors of $v^{-l_d}$ or $(1-v)^{-l_n}$. This is equivalent to a requirement that $S(u,v)$ be finite on the boundary. The exponents $l_d$ and $l_n$ provide that the partial derivatives of $P_{ij}(u,v)$ of orders less than $l_d$ and $l_n$ exist and are zero on the boundary. Suitable selection of the multiplicative auxiliary function provides a degree of control to the skillful lens designer.

In the method of an embodiment of the present invention, optimization of the performance of a lens is accomplished by varying one or more adjustable parameters that determine the shape of the lens in such a way that the value of a merit function is minimized. Alternatively, the merit function can be so constructed as to indicate optimized lens performance when its value is maximized. In accord with another embodiment of the present invention, the point merit function $m(x,y,\alpha,\beta,\gamma,\delta,\epsilon,\tau,\eta; A_h)$ is preferably constructed to be definite to help ensure the existence of a minimum or maximum in the merit figure. By definite it is meant that the point merit function is either positive definite or negative definite. If positive definite, it takes on only non-negative values; if negative definite it takes on only non-positive values.

One well-known kind of positive definite function which can be used as the point merit function is a sum of squares in which the relative importance of each element of the sum is determined by a positive multiplicative weighting factor. In that case, the point merit function can be written as:
$$m(x,y,\alpha,\beta,\gamma,\delta,\epsilon,\zeta,\eta; A_h) = w_\alpha \alpha^2 + w_\beta \beta^2 + w_\gamma \gamma^2 + w_\epsilon \epsilon^2 + w_\zeta \zeta^2 + w_\eta \eta^2 \quad (14)$$
where the w's are the weighting factors. In general, the values of weighting factors can be dependent on the point (x,y) on the lens surface where the point function is to be evaluated. It will be appreciated that in this way the relative importance of the quantitative measures of lens performance at each point in the optimization subregion R can be selectively varied and adjusted by the designer. Thus, the designer is provided with direct control over selected performance characteristics, especially in selected regions of the lens.

In another embodiment, it is possible to define as zero in Equation 14 the weighting factors of all the quantitative performance measures other than astigmatism α. Such a definition results in a point merit function and a global merit function which depend only on the surface measure of astigmatism; thus, from Equations 9, 10 and 14:

$$M(A_h) = \int_R m(x,y,\alpha:A_h)dR = \int_R w_\alpha \cdot \alpha^2 (x,y;A_h)dR \quad (15)$$

or equivalently:

$$M(A_h) = \sum_{K=1}^{K} w_\alpha (x_k,y_k) \cdot \alpha^2 (x_k,y_k;A_h) \quad (16)$$

where the positional dependence of the weighting factor $w_\alpha$ has been made explicit and the index k identifies a predetermined set of points $(x_1,y_1), (x_2,y_2), \ldots, (x_K,y_K)$ in the optimization subregion R. These points 22 are shown in FIG. 3b by the crosses in the intermediate region 14.

Numerical Example

The following description illustrates the operation of the method of the present invention by a specific numerical example. Numerical values of the improved surface function $Z_f(x,y;A_h)$, given by Equation 2, which were generated by the present method for each point (x,y) are tabulated in Table 1 of the Appendix. Also given in Table 1 are values of the surface measure of astigmatism α(x,y) which are computed from Equation 7a for each point of the improved surface. An azimuthal angle, θ(x,y), of the surface astigmatism which gives the angle with respect to a reference direction of the larger of the principal curvatures is also listed. Similarly, numerical values of the starting surface represented by the base function $Z_b(x,y)$ are tabulated for each point in Table 2 of the Appendix.

In the example, the optimization function $Z_h(u,v;A_h)$ was given by Equation 13 with $l_d=l_n=4$ in the optimization region R; thus, the optimization function and its first three partial derivatives were zero on the boundary. Outside the optimization region, the optimization function was identically zero. The form of the multiplicative auxiliary function S(u,v) used in the example was:

$$S(x,y) = \exp[-p(x,y) - q(x,y)] \quad (17)$$

where the auxiliary function is expressed in the Cartesian coordinate system for convenience. The component functions that comprise the auxiliary function used are given by:

$$p(x,y) = [(y-h)/(h_c-h)]^{n_h} (x/\sigma_x)^4 \quad (18)$$

and:

$$q(x,y) = [(y-y_c-y_{mr}x)/\sigma_y]^3 \text{ for } x \geq 0 \quad (19a)$$

$$= [(y-y_c-y_{ml}x)/\sigma_y]^3 \text{ for } x < 0 \quad (19b)$$

The constants h, $h_c, n_h, \sigma_x, y_c, y_{mr}, \sigma_y$ and $y_{ml}$ in Equation 18, 19a and 19b are tabulated in Table 3 of the Appendix, and control the shape and strength of the multiplicative auxiliary function. In this way, the multiplicative auxiliary function provides to the skillful designer a degree of direct control in addition to that provided by the weighting factors in th point merit function. The designer can achieve a desired overall lens performance by shaping the result computed with the selected weighting factors by the selected multiplicative auxiliary function.

The functions $f_d(x)$ and $f_n(x)$ used in the coordinate transformation of Equations 11a and 11b are given by:

$$f_d(x) = a_d x^2 + b_d x + c_d \quad (20a)$$

$$f_n(x) = a_n x^2 + b_n x + c_n \quad (20b)$$

which are second-degree polynomials. The coefficients of Equations 20a and 20b are listed in Table 4 of the Appendix.

In this numerical example, a merit function of the form of Equation 16 is selected and evaluated in a predetermined set of K=96 points. The Cartesian coordinates of the points and the weight assigned to each point are listed in the Appendix in Table 5. Also listed in Table 5 are the values of the surface measure of astigmatism α which are computed for the final surface $Z_f(x,y)$ according to Equation 7a.

Finally, the numerical values of the array $A_h$ of adjustable parameters which are generated by the method of the present invention are listed in Table 6 of the Appendix. It can be noted that the optimization function produced was a sixth-degree polynomial in x and only a second-degree polynomial in y. The degree of the optimization function is determined by a balance between the complexity of the surface needed to achieve a desired performance and the cost of carrying out the optimization.

Figure 6:
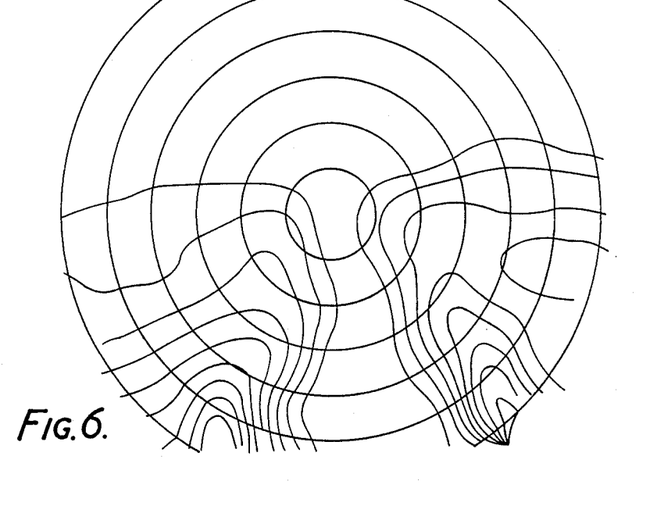
FIG. 6 is a contour plot of the surface measure of astigmatism of a starting lens surface to be optimized by the method of the present invention.
Figure 7:
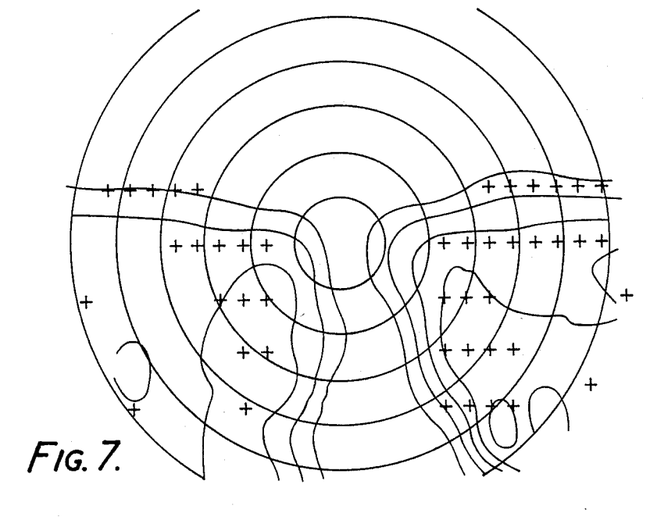
FIG. 7 is a contour plot of the surface measure of astigmatism of an improved lens surface optimized by the method of the present invention.

The improvement in the astigmatism performance of the lens which is achieved by the method of the present invention for the numerical example is shown by comparing FIG. 6 and FIG. 7. FIG. 6 shows a contour plot of the surface measure of astigmatism α for the base function $Z_b(x,y)$ listed in Table 2. FIG. 7 shows a contour plot of the surface measure of astigmatism α for the improved surface $Z_f(x,y)$ listed in Table 1. Each contour represents a change in astigmatism of 0.5 diopter. The lesser magnitude of the astigmatism of the improved design over the starting design is evident from FIGS. 6 and 7.

It is, of course, possible to embody the invention in other specific forms than those of the preferred embodiment described above. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

TABLE 1

| | Improved Surface Function $Z_f(x,y)$ | | | |
|---|---|---|---|---|
| x | y | $Z_f(x,y)$ | α(x,y) | θ(x,y) |
| −10.00 | 30.00 | 5.92 | 0.08 | 89.78 |
| −5.00 | 30.00 | 5.45 | 0.16 | 94.42 |
| 0.00 | 30.00 | 5.30 | 0.19 | 88.35 |
| 5.00 | 30.00 | 5.45 | 0.17 | 80.07 |
| 10.00 | 30.00 | 5.92 | 0.10 | 69.83 |
| −20.00 | 25.00 | 6.08 | 0.02 | 135.05 |
| −15.00 | 25.00 | 4.99 | 0.17 | 117.06 |
| −10.00 | 25.00 | 4.23 | 0.28 | 110.82 |
| −5.00 | 25.00 | 3.77 | 0.27 | 100.82 |
| 0.00 | 25.00 | 3.62 | 0.26 | 90.00 |
| 5.00 | 25.00 | 3.77 | 0.27 | 79.18 |
| 10.00 | 25.00 | 4.23 | 0.28 | 69.18 |
| 15.00 | 25.00 | 4.99 | 0.27 | 60.28 |
| 20.00 | 25.00 | 6.08 | 0.16 | 45.56 |
| −25.00 | 20.00 | 6.08 | 0.06 | 146.13 |

TABLE 1-continued

Improved Surface Function $Z_f(x,y)$

| x | y | $Z_f(x,y)$ | $\alpha(x,y)$ | $\theta(x,y)$ |
|---|---|---|---|---|
| −20.00 | 20.00 | 4.68 | 0.20 | 132.62 |
| −15.00 | 20.00 | 3.62 | 0.26 | 125.69 |
| −10.00 | 20.00 | 2.88 | 0.23 | 115.80 |
| −5.00 | 20.00 | 2.43 | 0.21 | 103.66 |
| 0.00 | 20.00 | 2.29 | 0.20 | 90.00 |
| 5.00 | 20.00 | 2.43 | 0.21 | 76.34 |
| 10.00 | 20.00 | 2.88 | 0.23 | 64.20 |
| 15.00 | 20.00 | 3.62 | 0.26 | 54.31 |
| 20.00 | 20.00 | 4.68 | 0.29 | 46.62 |
| 25.00 | 20.00 | 6.08 | 0.21 | 39.53 |
| −25.00 | 15.00 | 4.99 | 0.17 | 146.33 |
| −20.00 | 15.00 | 3.62 | 0.26 | 141.94 |
| −15.00 | 15.00 | 2.58 | 0.22 | 134.14 |
| −10.00 | 15.00 | 1.85 | 0.17 | 123.12 |
| −5.00 | 15.00 | 1.42 | 0.14 | 108.15 |
| 0.00 | 15.00 | 1.27 | 0.13 | 90.00 |
| 5.00 | 15.00 | 1.42 | 0.14 | 71.85 |
| 10.00 | 15.00 | 1.85 | 0.17 | 56.88 |
| 15.00 | 15.00 | 2.58 | 0.22 | 45.86 |
| 20.00 | 15.00 | 3.62 | 0.26 | 38.06 |
| 25.00 | 15.00 | 4.99 | 0.29 | 32.52 |
| −30.00 | 10.00 | 5.92 | 0.17 | 81.95 |
| −25.00 | 10.00 | 4.23 | 0.06 | 137.84 |
| −20.00 | 10.00 | 2.88 | 0.18 | 151.43 |
| −15.00 | 10.00 | 1.85 | 0.17 | 145.75 |
| −10.00 | 10.00 | 1.13 | 0.12 | 134.63 |
| −5.00 | 10.00 | 0.70 | 0.08 | 116.38 |
| 0.00 | 10.00 | 0.56 | 0.06 | 90.00 |
| 5.00 | 10.00 | 0.70 | 0.08 | 63.62 |
| 10.00 | 10.00 | 1.13 | 0.12 | 45.37 |
| 15.00 | 10.00 | 1.85 | 0.17 | 34.25 |
| 20.00 | 10.00 | 2.88 | 0.23 | 27.34 |
| 25.00 | 10.00 | 4.23 | 0.15 | 25.16 |
| 30.00 | 10.00 | 5.92 | 0.12 | 82.03 |
| −30.00 | 5.00 | 5.47 | 0.78 | 87.82 |
| −25.00 | 5.00 | 3.79 | 0.71 | 84.22 |
| −20.00 | 5.00 | 2.44 | 0.68 | 77.71 |
| −15.00 | 5.00 | 1.42 | 0.57 | 75.70 |
| −10.00 | 5.00 | 0.70 | 0.34 | 77.59 |
| −5.00 | 5.00 | 0.28 | 0.12 | 83.22 |
| 0.00 | 5.00 | 0.14 | 0.03 | 85.10 |
| 5.00 | 5.00 | 0.28 | 0.07 | 90.63 |
| 10.00 | 5.00 | 0.70 | 0.37 | 101.13 |
| 15.00 | 5.00 | 1.42 | 0.80 | 102.73 |
| 20.00 | 5.00 | 2.44 | 0.98 | 100.00 |
| 25.00 | 5.00 | 3.78 | 0.94 | 93.74 |
| −30.00 | 5.00 | 5.47 | 0.93 | 87.10 |
| −30.00 | 0.00 | 5.38 | 1.39 | 90.32 |
| −25.00 | 0.00 | 3.69 | 1.32 | 84.11 |
| −20.00 | 0.00 | 2.34 | 1.26 | 77.62 |
| −15.00 | 0.00 | 1.31 | 1.24 | 72.59 |
| −10.00 | 0.00 | 0.58 | 1.18 | 67.25 |
| −5.00 | 0.00 | 0.15 | 0.93 | 60.29 |
| 0.00 | 0.00 | 0.00 | 0.20 | 61.63 |
| 5.00 | 0.00 | 0.15 | 0.93 | 128.36 |
| 10.00 | 0.00 | 0.59 | 1.55 | 120.55 |
| 15.00 | 0.00 | 1.32 | 1.64 | 110.18 |
| 20.00 | 0.00 | 2.35 | 1.67 | 100.01 |
| 25.00 | 0.00 | 3.70 | 1.77 | 92.07 |
| 30.00 | 0.00 | 5.38 | 1.87 | 85.83 |
| −30.00 | −5.00 | 5.67 | 1.39 | 88.50 |
| −25.00 | −5.00 | 3.97 | 1.31 | 76.66 |
| −20.00 | −5.00 | 2.60 | 1.25 | 70.82 |
| −15.00 | −5.00 | 1.55 | 1.38 | 67.55 |
| −10.00 | −5.00 | 0.79 | 1.60 | 63.94 |
| −5.00 | −5.00 | 0.33 | 1.35 | 60.43 |
| 0.00 | −5.00 | 0.16 | 0.35 | 59.82 |
| 5.00 | −5.00 | 0.32 | 0.92 | 134.91 |
| 10.00 | −5.00 | 0.79 | 1.83 | 127.83 |
| 15.00 | −5.00 | 1.57 | 2.00 | 121.55 |
| 20.00 | −5.00 | 2.64 | 1.86 | 114.13 |
| 25.00 | −5.00 | 4.01 | 1.86 | 103.25 |
| 30.00 | −5.00 | 5.71 | 2.05 | 93.68 |
| −30.00 | −10.00 | 6.34 | 1.09 | 83.98 |
| −25.00 | −10.00 | 4.62 | 1.09 | 71.93 |
| −20.00 | −10.00 | 3.21 | 1.10 | 73.66 |
| −15.00 | −10.00 | 2.13 | 1.49 | 73.11 |
| −10.00 | −10.00 | 1.34 | 1.73 | 72.10 |
| −5.00 | −10.00 | 0.84 | 1.43 | 69.76 |

TABLE 1-continued

Improved Surface Function $Z_f(x,y)$

| x | y | $Z_f(x,y)$ | $\alpha(x,y)$ | $\theta(x,y)$ |
|---|---|---|---|---|
| 0.00 | −10.00 | 0.65 | 0.62 | 58.58 |
| 5.00 | −10.00 | 0.81 | 0.65 | 132.78 |
| 10.00 | −10.00 | 1.33 | 1.81 | 119.76 |
| 15.00 | −10.00 | 2.16 | 2.20 | 115.50 |
| 20.00 | −10.00 | 3.28 | 2.24 | 115.05 |
| 25.00 | −10.00 | 4.71 | 2.17 | 112.99 |
| 30.00 | −10.00 | 6.45 | 2.08 | 107.31 |
| −25.00 | −15.00 | 5.61 | 1.00 | 87.59 |
| −20.00 | −15.00 | 4.18 | 1.06 | 83.46 |
| −15.00 | −15.00 | 3.06 | 1.53 | 83.03 |
| −10.00 | −15.00 | 2.25 | 1.67 | 81.28 |
| −5.00 | −15.00 | 1.72 | 1.44 | 72.43 |
| 0.00 | −15.00 | 1.51 | 0.28 | 58.61 |
| 5.00 | −15.00 | 1.67 | 0.14 | 146.45 |
| 10.00 | −15.00 | 2.22 | 1.36 | 122.65 |
| 15.00 | −15.00 | 3.10 | 2.22 | 111.54 |
| 20.00 | −15.00 | 4.29 | 2.14 | 110.90 |
| 25.00 | −15.00 | 5.78 | 2.26 | 111.60 |
| −25.00 | −20.00 | 6.98 | 1.26 | 94.68 |
| −20.00 | −20.00 | 5.52 | 1.19 | 92.11 |
| −15.00 | −20.00 | 4.38 | 1.47 | 90.11 |
| −10.00 | −20.00 | 3.54 | 1.64 | 86.06 |
| −5.00 | −20.00 | 2.99 | 1.03 | 83.40 |
| 0.00 | −20.00 | 2.77 | 0.13 | 108.25 |
| 5.00 | −20.00 | 2.93 | 0.07 | 13.60 |
| 10.00 | −20.00 | 3.49 | 0.36 | 94.08 |
| 15.00 | −20.00 | 4.43 | 2.35 | 112.97 |
| 20.00 | −20.00 | 5.68 | 1.90 | 108.11 |
| 25.00 | −20.00 | 7.24 | 2.01 | 109.57 |
| −20.00 | −25.00 | 7.26 | 1.36 | 92.24 |
| −15.00 | −25.00 | 6.09 | 1.45 | 92.86 |
| −10.00 | −25.00 | 5.23 | 1.97 | 94.03 |
| −5.00 | −25.00 | 4.67 | 0.99 | 102.97 |
| 0.00 | −25.00 | 4.45 | 0.13 | 116.57 |
| 5.00 | −25.00 | 4.62 | 0.19 | 9.70 |
| 10.00 | −25.00 | 5.19 | 0.15 | 79.36 |
| 15.00 | −25.00 | 6.16 | 1.04 | 94.65 |
| 20.00 | −25.00 | 7.49 | 2.29 | 106.64 |
| −10.00 | −30.00 | 7.37 | 1.73 | 100.74 |
| −5.00 | −30.00 | 6.80 | 0.87 | 109.57 |
| 0.00 | −30.00 | 6.58 | 0.26 | 143.47 |
| 5.00 | −30.00 | 6.76 | 0.33 | 1.09 |
| 10.00 | −30.00 | 7.35 | 0.16 | 31.77 |

TABLE 2

Starting Surface Function $Z_b(x,y)$

| x | y | $Z_b(x,y)$ | $\alpha(x,y)$ | $\theta(x,y)$ |
|---|---|---|---|---|
| −10.00 | 30.00 | 5.92 | 0.15 | 139.02 |
| −5.00 | 30.00 | 5.45 | 0.05 | 105.68 |
| 0.00 | 30.00 | 5.30 | 0.11 | 80.22 |
| 5.00 | 30.00 | 5.45 | 0.17 | 71.82 |
| 10.00 | 30.00 | 5.92 | 0.22 | 65.40 |
| −20.00 | 25.00 | 6.08 | 0.29 | 115.39 |
| −15.00 | 25.00 | 4.99 | 0.28 | 120.48 |
| −10.00 | 25.00 | 4.23 | 0.28 | 110.82 |
| −5.00 | 25.00 | 3.77 | 0.27 | 100.82 |
| 0.00 | 25.00 | 3.62 | 0.26 | 90.00 |
| 5.00 | 25.00 | 3.77 | 0.27 | 79.18 |
| 10.00 | 25.00 | 4.23 | 0.28 | 69.18 |
| 15.00 | 25.00 | 4.99 | 0.28 | 60.54 |
| 20.00 | 25.00 | 6.08 | 0.14 | 61.51 |
| −25.00 | 20.00 | 6.07 | 0.18 | 96.10 |
| −20.00 | 20.00 | 4.68 | 0.24 | 129.65 |
| −15.00 | 20.00 | 3.62 | 0.26 | 125.69 |
| −10.00 | 20.00 | 2.88 | 0.23 | 115.80 |
| −5.00 | 20.00 | 2.43 | 0.21 | 103.66 |
| 0.00 | 20.00 | 2.29 | 0.20 | 90.00 |
| 5.00 | 20.00 | 2.43 | 0.21 | 76.34 |
| 10.00 | 20.00 | 2.88 | 0.23 | 64.20 |
| 15.00 | 20.00 | 3.62 | 0.26 | 54.31 |
| 20.00 | 20.00 | 4.68 | 0.29 | 46.62 |
| 25.00 | 20.00 | 6.08 | 0.14 | 30.28 |
| −25.00 | 15.00 | 4.99 | 0.12 | 148.80 |
| −20.00 | 15.00 | 3.62 | 0.26 | 141.94 |
| −15.00 | 15.00 | 2.58 | 0.22 | 134.14 |
| −10.00 | 15.00 | 1.85 | 0.17 | 123.12 |
| −5.00 | 15.00 | 1.42 | 0.14 | 108.15 |

TABLE 2-continued

Starting Surface Function $Z_b(x,y)$

| x | y | $Z_b(x,y)$ | $\alpha(x,y)$ | $\theta(x,y)$ |
|---|---|---|---|---|
| 0.00 | 15.00 | 1.27 | 0.13 | 90.00 |
| 5.00 | 15.00 | 1.42 | 0.14 | 71.85 |
| 10.00 | 15.00 | 1.85 | 0.17 | 56.88 |
| 15.00 | 15.00 | 2.58 | 0.22 | 45.86 |
| 20.00 | 15.00 | 3.62 | 0.26 | 38.06 |
| 25.00 | 15.00 | 4.99 | 0.29 | 32.47 |
| −30.00 | 10.00 | 5.92 | 0.42 | 14.42 |
| −25.00 | 10.00 | 4.23 | 0.20 | 156.57 |
| −20.00 | 10.00 | 2.88 | 0.21 | 152.08 |
| −15.00 | 10.00 | 1.85 | 0.17 | 145.75 |
| −10.00 | 10.00 | 1.13 | 0.12 | 134.63 |
| −5.00 | 10.00 | 0.70 | 0.08 | 116.38 |
| 0.00 | 10.00 | 0.56 | 0.06 | 90.00 |
| 5.00 | 10.00 | 0.70 | 0.08 | 63.62 |
| 10.00 | 10.00 | 1.13 | 0.12 | 45.37 |
| 15.00 | 10.00 | 1.85 | 0.17 | 34.25 |
| 20.00 | 10.00 | 2.88 | 0.23 | 27.34 |
| 25.00 | 10.00 | 4.23 | 0.16 | 25.06 |
| 30.00 | 10.00 | 5.92 | 0.20 | 22.53 |
| −30.00 | 5.00 | 5.46 | 0.37 | 177.21 |
| −25.00 | 5.00 | 3.78 | 0.21 | 111.88 |
| −20.00 | 5.00 | 2.44 | 0.27 | 90.26 |
| −15.00 | 5.00 | 1.42 | 0.31 | 81.95 |
| −10.00 | 5.00 | 0.70 | 0.24 | 81.21 |
| −5.00 | 5.00 | 0.28 | 0.10 | 85.43 |
| 0.00 | 5.00 | 0.14 | 0.03 | 85.39 |
| 5.00 | 5.00 | 0.28 | 0.07 | 91.08 |
| 10.00 | 5.00 | 0.70 | 0.38 | 101.24 |
| 15.00 | 5.00 | 1.42 | 0.82 | 102.33 |
| 20.00 | 5.00 | 2.44 | 0.96 | 98.98 |
| 25.00 | 5.00 | 3.78 | 0.86 | 92.11 |
| 30.00 | 5.00 | 5.47 | 0.67 | 81.67 |
| −30.00 | 0.00 | 5.32 | 0.51 | 152.47 |
| −25.00 | 0.00 | 3.65 | 0.61 | 109.55 |
| −20.00 | 0.00 | 2.32 | 0.73 | 95.79 |
| −15.00 | 0.00 | 1.30 | 0.87 | 84.64 |
| −10.00 | 0.00 | 0.58 | 0.95 | 74.23 |
| −5.00 | 0.00 | 0.15 | 0.84 | 63.66 |
| 0.00 | 0.00 | 0.00 | 0.20 | 63.76 |
| 5.00 | 0.00 | 0.15 | 0.94 | 128.81 |
| 10.00 | 0.00 | 0.59 | 1.55 | 120.68 |
| 15.00 | 0.00 | 1.32 | 1.56 | 109.33 |
| 20.00 | 0.00 | 2.35 | 1.50 | 97.48 |
| 25.00 | 0.00 | 3.70 | 1.51 | 88.53 |
| 30.00 | 0.00 | 5.38 | 1.46 | 81.64 |
| −30.00 | −5.00 | 5.52 | 0.91 | 144.12 |
| −25.00 | −5.00 | 3.86 | 0.85 | 116.20 |
| −20.00 | −5.00 | 2.53 | 0.92 | 101.60 |
| −15.00 | −5.00 | 1.51 | 1.09 | 86.59 |
| −10.00 | −5.00 | 0.78 | 1.39 | 73.54 |
| −5.00 | −5.00 | 0.32 | 1.30 | 65.74 |
| 0.00 | −5.00 | 0.16 | 0.36 | 62.93 |
| 5.00 | −5.00 | 0.32 | 0.93 | 135.45 |
| 10.00 | −5.00 | 0.79 | 1.75 | 126.56 |
| 15.00 | −5.00 | 1.57 | 1.74 | 119.41 |
| 20.00 | −5.00 | 2.63 | 1.45 | 111.93 |
| 25.00 | −5.00 | 3.99 | 1.34 | 99.58 |
| 30.00 | −5.00 | 5.67 | 1.44 | 88.68 |
| −30.00 | −10.00 | 6.04 | 1.32 | 140.44 |
| −25.00 | −10.00 | 4.40 | 1.07 | 121.23 |
| −20.00 | −10.00 | 3.08 | 1.30 | 107.41 |
| −15.00 | −10.00 | 2.06 | 1.58 | 93.20 |
| −10.00 | −10.00 | 1.31 | 1.91 | 84.55 |
| −5.00 | −10.00 | 0.84 | 1.68 | 76.41 |
| 0.00 | −10.00 | 0.65 | 0.66 | 60.68 |
| 5.00 | −10.00 | 0.81 | 0.64 | 133.26 |
| 10.00 | −10.00 | 1.32 | 1.91 | 117.12 |
| 15.00 | −10.00 | 2.15 | 2.20 | 107.58 |
| 20.00 | −10.00 | 3.25 | 1.81 | 105.85 |
| 25.00 | −10.00 | 4.65 | 1.53 | 107.45 |
| 30.00 | −10.00 | 6.36 | 1.47 | 105.68 |
| −25.00 | −15.00 | 5.27 | 1.68 | 120.23 |
| −20.00 | −15.00 | 3.97 | 1.98 | 111.04 |
| −15.00 | −15.00 | 2.96 | 2.44 | 102.05 |
| −10.00 | −15.00 | 2.21 | 2.69 | 92.18 |
| −5.00 | −15.00 | 1.72 | 2.05 | 74.95 |
| 0.00 | −15.00 | 1.51 | 0.30 | 59.38 |
| 5.00 | −15.00 | 1.67 | 0.13 | 146.57 |
| 10.00 | −15.00 | 2.22 | 1.49 | 121.76 |
| 15.00 | −15.00 | 3.09 | 2.96 | 106.76 |
| 20.00 | −15.00 | 4.24 | 2.31 | 93.64 |
| 25.00 | −15.00 | 5.67 | 1.76 | 98.13 |
| −25.00 | −20.00 | 6.52 | 2.47 | 114.50 |
| −20.00 | −20.00 | 5.24 | 2.77 | 111.06 |
| −15.00 | −20.00 | 4.25 | 3.40 | 106.21 |
| −10.00 | −20.00 | 3.51 | 3.53 | 86.18 |
| −5.00 | −20.00 | 2.99 | 1.33 | 78.03 |
| 0.00 | −20.00 | 2.77 | 0.13 | 108.25 |
| 5.00 | −20.00 | 2.93 | 0.07 | 13.60 |
| 10.00 | −20.00 | 3.49 | 0.36 | 94.08 |
| 15.00 | −20.00 | 4.43 | 3.23 | 113.69 |
| 20.00 | −20.00 | 5.64 | 3.20 | 99.36 |
| 25.00 | −20.00 | 7.11 | 2.09 | 94.22 |
| −20.00 | −25.00 | 6.94 | 3.47 | 109.20 |
| −15.00 | −25.00 | 5.98 | 4.03 | 95.63 |
| −10.00 | −25.00 | 5.23 | 4.21 | 80.74 |
| −5.00 | −25.00 | 4.67 | 0.99 | 102.97 |
| 0.00 | −25.00 | 4.45 | 0.13 | 116.57 |
| 5.00 | −25.00 | 4.62 | 0.19 | 9.70 |
| 10.00 | −25.00 | 5.19 | 0.16 | 82.89 |
| 15.00 | −25.00 | 6.16 | 1.18 | 97.17 |
| 20.00 | −25.00 | 7.48 | 4.97 | 111.31 |
| −10.00 | −30.00 | 7.38 | 3.03 | 95.03 |
| −5.00 | −30.00 | 6.81 | 1.56 | 96.13 |
| 0.00 | −30.00 | 6.59 | 0.58 | 90.79 |
| 5.00 | −30.00 | 6.76 | 0.21 | 69.94 |
| 10.00 | −30.00 | 7.35 | 0.31 | 79.00 |

TABLE 3

Auxiliary Function Constants

| | | | |
|---|---|---|---|
| $\sigma_x =$ | 45.0 | $\sigma_y =$ | 25.0 |
| $h =$ | −50.0 | $y_c =$ | 5.0 |
| $h_c =$ | 0.0 | $y_{ml} =$ | 0.75 |
| $n_h =$ | 2 | $y_{mr} =$ | −0.80 |

TABLE 4

Coefficients of the Boundary Functions $f_d(x)$ and $f_n(x)$

| | |
|---|---|
| $a_d =$ | 0.011073 |
| $b_d =$ | 0.000000 |
| $c_d =$ | 5.000000 |
| $a_n =$ | −0.064000 |
| $b_n =$ | 0.360000 |
| $c_n =$ | −19.000000 |

TABLE 5

Point Merit Function $m(x,y,\alpha;A_h)$

| Point Index k | $x_k$ | $y_k$ | Weight $W_\alpha(x_k,y_k)$ | $\alpha$ |
|---|---|---|---|---|
| 1 | 10.00 | −25.00 | 0.0000 | |
| 2 | 10.00 | −19.00 | 0.3600 | 1.30 |
| 3 | 10.00 | −13.00 | 0.5200 | 2.02 |
| 4 | 10.00 | −7.00 | 0.6800 | 2.00 |
| 5 | 10.00 | −1.00 | 0.8400 | 1.61 |
| 6 | 10.00 | 5.00 | 0.0000 | |
| 7 | 12.50 | −25.00 | 0.0000 | |
| 8 | 12.50 | −19.00 | 0.4000 | 2.33 |
| 9 | 12.50 | −13.00 | 0.6500 | 2.16 |
| 10 | 12.50 | −7.00 | 0.5926 | 2.10 |
| 11 | 12.50 | −1.00 | 0.7320 | 1.64 |
| 12 | 12.50 | 5.00 | 0.0000 | |
| 13 | 15.00 | −25.00 | 0.0000 | |
| 14 | 15.00 | −19.00 | 0.4000 | 2.31 |
| 15 | 15.00 | −13.00 | 0.0500 | 2.20 |
| 16 | 15.00 | −7.00 | 0.5051 | 2.04 |
| 17 | 15.00 | −1.00 | 0.6240 | 1.64 |
| 18 | 15.00 | 5.00 | 0.7429 | 0.51 |
| 19 | 17.50 | −25.00 | 0.0000 | |
| 20 | 17.50 | −19.00 | 0.2000 | 1.97 |
| 21 | 17.50 | −13.00 | 0.1500 | 2.26 |

TABLE 5-continued

Point Merit Function $m(x,y,\alpha;A_h)$

| Point Index k | $x_k$ | $y_k$ | Weight $W_\alpha(x_k,y_k)$ | $\alpha$ |
|---|---|---|---|---|
| 22 | 17.50 | −7.00 | 0.0000 | |
| 23 | 17.50 | −1.00 | 0.5160 | 1.66 |
| 24 | 17.50 | 5.00 | 0.6143 | 0.64 |
| 25 | 20.00 | −25.00 | 0.0000 | |
| 26 | 20.00 | −19.00 | 0.0000 | |
| 27 | 20.00 | −13.00 | 0.0000 | |
| 28 | 20.00 | −7.00 | 0.0000 | |
| 29 | 20.00 | −1.00 | 0.4080 | 1.69 |
| 30 | 20.00 | 5.00 | 0.4857 | 0.69 |
| 31 | 22.50 | −25.00 | 0.0000 | |
| 32 | 22.50 | −19.00 | 0.0000 | |
| 33 | 22.50 | −13.00 | 0.0000 | |
| 34 | 22.50 | −7.00 | 0.0000 | |
| 35 | 22.50 | −1.00 | 0.3000 | 1.75 |
| 36 | 22.50 | 5.00 | 0.3571 | 0.69 |
| 37 | 26.00 | −17.00 | 0.1500 | 2.26 |
| 38 | 25.00 | −19.00 | 0.0000 | |
| 39 | 25.00 | −13.00 | 0.0000 | |
| 40 | 25.00 | −7.00 | 0.0000 | |
| 41 | 25.00 | −1.00 | 0.1920 | 1.81 |
| 42 | 25.00 | 5.00 | 0.2286 | 0.67 |
| 43 | 27.50 | −25.00 | 0.0000 | |
| 44 | 27.50 | −19.00 | 0.0000 | |
| 45 | 27.50 | −11.00 | 0.0000 | |
| 46 | 30.00 | −7.00 | 0.2000 | 2.33 |
| 47 | 27.50 | −1.00 | 0.0840 | 1.87 |
| 48 | 27.50 | 5.00 | 0.1000 | 0.63 |
| 49 | −10.00 | −25.00 | 0.1500 | 1.81 |
| 50 | −9.00 | −19.00 | 0.4000 | 1.62 |
| 51 | −10.00 | −13.00 | 0.5200 | 1.67 |
| 52 | −10.00 | −7.00 | 0.6800 | 1.64 |
| 53 | −10.00 | −1.00 | 0.8400 | 1.13 |
| 54 | −10.00 | 5.00 | 0.0000 | |
| 55 | −12.50 | −25.00 | 0.0000 | |
| 56 | −12.50 | −19.00 | 0.5000 | 1.61 |
| 57 | −12.50 | −13.00 | 0.7000 | 1.72 |
| 58 | −12.50 | −7.00 | 0.6000 | 1.63 |
| 59 | −12.50 | −1.00 | 0.7320 | 1.20 |
| 60 | −12.50 | 5.00 | 0.0000 | |
| 61 | −15.00 | −25.00 | 0.0000 | |
| 62 | −15.00 | −19.00 | 0.0000 | |
| 63 | −15.00 | −13.00 | 0.0000 | |
| 64 | −15.00 | −7.00 | 0.5051 | 1.50 |
| 65 | −15.00 | −1.00 | 0.6240 | 1.23 |
| 66 | −15.00 | 5.00 | 0.0000 | |
| 67 | −17.50 | −25.00 | 0.0000 | |
| 68 | −17.50 | −19.00 | 0.0000 | |
| 69 | −17.50 | −13.00 | 0.0000 | |
| 70 | −17.50 | −7.00 | 0.0000 | |
| 71 | −17.50 | −1.00 | 0.5160 | 1.24 |
| 72 | −17.50 | 5.00 | 0.6143 | 0.37 |
| 73 | −20.00 | −25.00 | 0.0000 | |
| 74 | −20.00 | −19.00 | 0.0000 | |
| 75 | −20.00 | −13.00 | 0.0000 | |
| 76 | −20.00 | −7.00 | 0.0000 | |
| 77 | −20.00 | −1.00 | 0.4080 | 1.25 |
| 78 | −20.00 | 5.00 | 0.4857 | 0.45 |
| 79 | −22.50 | −25.00 | 0.0000 | |
| 80 | −22.50 | −19.00 | 0.0000 | |
| 81 | −22.50 | −13.00 | 0.0000 | |
| 82 | −22.50 | −7.00 | 0.0000 | |
| 83 | −22.50 | −1.00 | 0.0000 | |
| 84 | −22.50 | 5.00 | 0.3571 | 0.50 |
| 85 | −25.00 | −25.00 | 0.0000 | |
| 86 | −25.00 | −19.00 | 0.1200 | 0.74 |
| 87 | −25.00 | −13.00 | 0.0000 | |
| 88 | −25.00 | −7.00 | 0.0000 | |
| 89 | −25.00 | −1.00 | 0.0000 | |
| 90 | −25.00 | 5.00 | 0.2286 | 0.52 |
| 91 | −27.50 | −25.00 | 0.0000 | |
| 92 | −27.50 | −19.00 | 0.0000 | |
| 93 | −30.00 | −7.00 | 0.2500 | 1.41 |
| 94 | −27.50 | −7.00 | 0.0000 | |
| 95 | −27.50 | −1.00 | 0.0000 | |
| 96 | −27.50 | 5.00 | 0.1000 | 0.53 |

TABLE 6

Optimized Values of the Adjustable Parameter Matrix $A_h$

| j \ i | 3 | 4 | 5 | 6 |
|---|---|---|---|---|
| 0 | $-1.75 \times 10^{-3}$ | $2.17 \times 10^{-4}$ | $-2.31 \times 10^{-6}$ | $3.20 \times 10^{-8}$ |
| 1 | $3.63 \times 10^{-3}$ | $-7.18 \times 10^{-4}$ | $3.09 \times 10^{-6}$ | $1.41 \times 10^{-7}$ |
| 2 | $-1.53 \times 10^{-2}$ | $1.87 \times 10^{-3}$ | $-1.50 \times 10^{-5}$ | $-6.45 \times 10^{-7}$ |

We claim:

1. A method for optimizing an ophthalmic progressive lens having a distance viewing zone, a near viewing zone and an intermediate zone in which there occurs a gradual change in optical power from the distance zone to the near zone, the ophthalmic progressive lens having at least one quantitative performance characteristic, comprising the steps of:
   representing a surface of the progressive lens to be optimized by a base surface function;
   using a merit function relating the at least one performance characteristic to a merit figure of the progressive lens;
   choosing using an optimization function having at least one adjustable parameter;
   defining a subregion of the surface of the progressive lens, the subregion having a boundary;
   imposing at least one boundary condition on the optimization function along the subregion boundary;
   combining the base surface function and the optimization function to form a new surface function;
   optimizing the merit figure of the new surface function having the at least one adjustable parameter of the optimization function to obtain an improved surface function representing an improved surface of the progressive lens; and
   forming a lens surface responsive to said improved surface function.

2. The method of claim 1, wherein the subregion lies within the intermediate zone.

3. The method of claim 1, wherein the subregion is coextensive with the intermediate zone.

4. The method of claim 1, wherein the at least one boundary condition is homogenous.

5. The method of claim 4, wherein the at least one boundary condition includes the conditions that the optimization function and the first three partial derivatives of the optimization function across the boundary are zero on the boundary.

6. The method of claim 1, wherein the merit function is quadratic with respect to at least one adjustable parameter.

7. The method of claim 6, wherein an optimum value of the at least one adjustable parameter is obtained by direct solution.

8. The method of claim 1, wherein an optimum value of the at least one adjustable parameter is obtained by an iterative procedure.

9. The method of claim 1, wherein the merit function is positive definite and wherein the base surface function and the optimization function are combined through addition.

10. The method of claim 9, wherein optimizing the merit figure comprises minimizing the merit figure.

11. The method of claim 9, wherein optimizing the merit figure comprises maximizing the merit figure.

12. The method of claim 1, wherein the at least one performance characteristic is at least one of astigmatism, orthoscopy, mean curvature, and deviation from a target surface.

13. The method of claim 1, wherein the at least one performance characteristic is surface astigmatism.

14. The method of claim 13, wherein a square of a surface astigmatism, $\alpha^2$, is used in evaluating the merit figure and wherein the square of the surface astigmatism is obtained by evaluating the following expression for at least one point:

$$\alpha^2 = (Z_{yy} - Z_{xx})^2 + 4Z^2_{xy}$$

wherein Z is the surface height of the new surface function, and the derivatives $Z_{xy}$, $Z_{yy}$ and $Z_{xx}$ are computed relative to a tangent plane at the point of evaluation.

15. The method of claim 1, wherein the at least one performance characteristic is a combination of surface astigmatism and oblique astigmatism.

16. A method for optimizing a lens, comprising the steps of:
selecting a base surface function for a surface of a progressive lens having a distance viewing zone, a near viewing zone and an intermediate zone in which there occurs a gradual change in optical power from the distance zone to the near zone;
constructing a merit function relating a weighted sum of squares of surface astigmatism at a plurality of preselected points to a merit figure of the progressive lens;
using an optimization function having at least one adjustable parameter;
combining the base surface function and the optimization function to form a new surface function;
extremizing the merit figure of the new surface function having the at least one adjustable parameter of the optimization function to obtain an improved surface function representing an improved surface of the progressive lens; and
forming a lens surface responsive to said improved surface function.

17. The method of claim 16, further comprising the steps of:
defining a subregion of the surface of the progressive lens, the subregion having a boundary; and
imposing on the optimization function boundary conditions that the optimization function and the first three partial derivatives of the optimization function across the boundary are zero on the boundary.

18. The method of claim 17, wherein the subregion lies in the intermediate zone.

19. The method of claim 17, wherein the subregion is coextensive with the intermediate zone.

20. The method of claim 16, wherein the optimization function ($Z_h$) used is of the form $$Z_h(u,v) = \sum_{ij} A_{ij} u^i v^j$$

wherein (u,v) are curvilinear coordinates, and wherein coefficients $A_{ij}$ include the at least one adjustable parameter.

* * * * *